United States Patent
Ferro et al.

(10) Patent No.: US 8,163,210 B2
(45) Date of Patent: Apr. 24, 2012

(54) METHOD OF VULCANISING PNEUMATIC TYRES AND APPARATUS THEREFOR

(75) Inventors: Paolo Ferro, Milan (IT); Claudio Zanichelli, Milan (IT); Stefano Cazzanti, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 526 days.

(21) Appl. No.: 12/083,084

(22) PCT Filed: Oct. 27, 2005

(86) PCT No.: PCT/IT2005/000622
§ 371 (c)(1),
(2), (4) Date: Sep. 15, 2009

(87) PCT Pub. No.: WO2007/049310
PCT Pub. Date: May 3, 2007

(65) Prior Publication Data
US 2010/0001423 A1    Jan. 7, 2010

(51) Int. Cl.
*B29C 35/02* (2006.01)
(52) U.S. Cl. ........... 264/40.6; 264/326; 374/53; 425/29; 700/199
(58) Field of Classification Search ............ 264/40.6, 264/326; 425/29, 40, 42, 144; 374/53; 700/199
See application file for complete search history.

(56) References Cited

U.S. PATENT DOCUMENTS

| | | | |
|---|---|---|---|
| 3,649,729 A | 3/1972 | Davis et al. | |
| 3,718,721 A | 2/1973 | Gould et al. | |
| 3,819,915 A * | 6/1974 | Smith | 425/29 |
| 3,980,743 A * | 9/1976 | Smith | 425/29 |
| 4,022,555 A | 5/1977 | Smith | |
| 4,044,600 A * | 8/1977 | Claxton et al. | 425/29 |
| 4,143,114 A * | 3/1979 | Smith et al. | 264/40.6 |
| 4,371,483 A * | 2/1983 | Mattson | 264/40.6 |
| 4,589,072 A | 5/1986 | Arimatsu | |
| 5,055,245 A * | 10/1991 | Hisatomi et al. | 264/40.6 |
| 6,478,991 B1 * | 11/2002 | Mancosu et al. | 264/40.6 |

FOREIGN PATENT DOCUMENTS
WO WO 01/32409 A1 5/2001
* cited by examiner

*Primary Examiner* — James Mackey
(74) *Attorney, Agent, or Firm* — Finnegan, Henderson, Farabow, Garrett & Dunner, L.L.P.

(57) ABSTRACT

A tire enclosed in a vulcanization mold is supplied with heat to cause vulcanization of same. By thermal-detection probes introduced into the tire monitoring of the cross-linking degree reached in at least one first detection region and one second detection region disposed within the tire is carried out. Head supply is stopped on occurrence of the following conditions: (i) the crosslinking degree measured in at least one of the detection regions reaches a first reference value higher than 90% of the whole cross-linking; and (ii) the cross-linking degree measured in each detection region has overcome a second pre-established reference value not exceeding about 50% of the whole cross-linking.

37 Claims, 4 Drawing Sheets

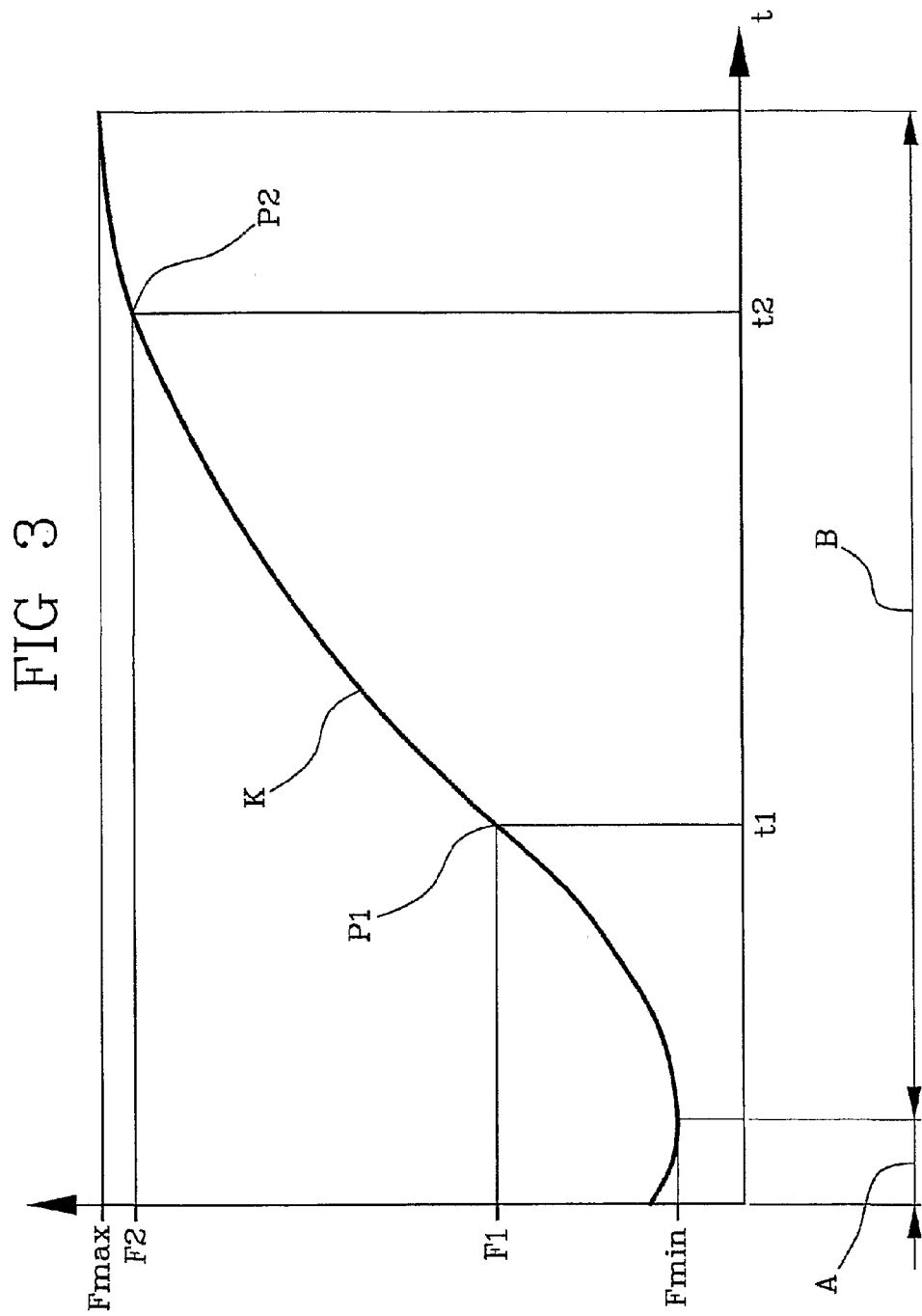

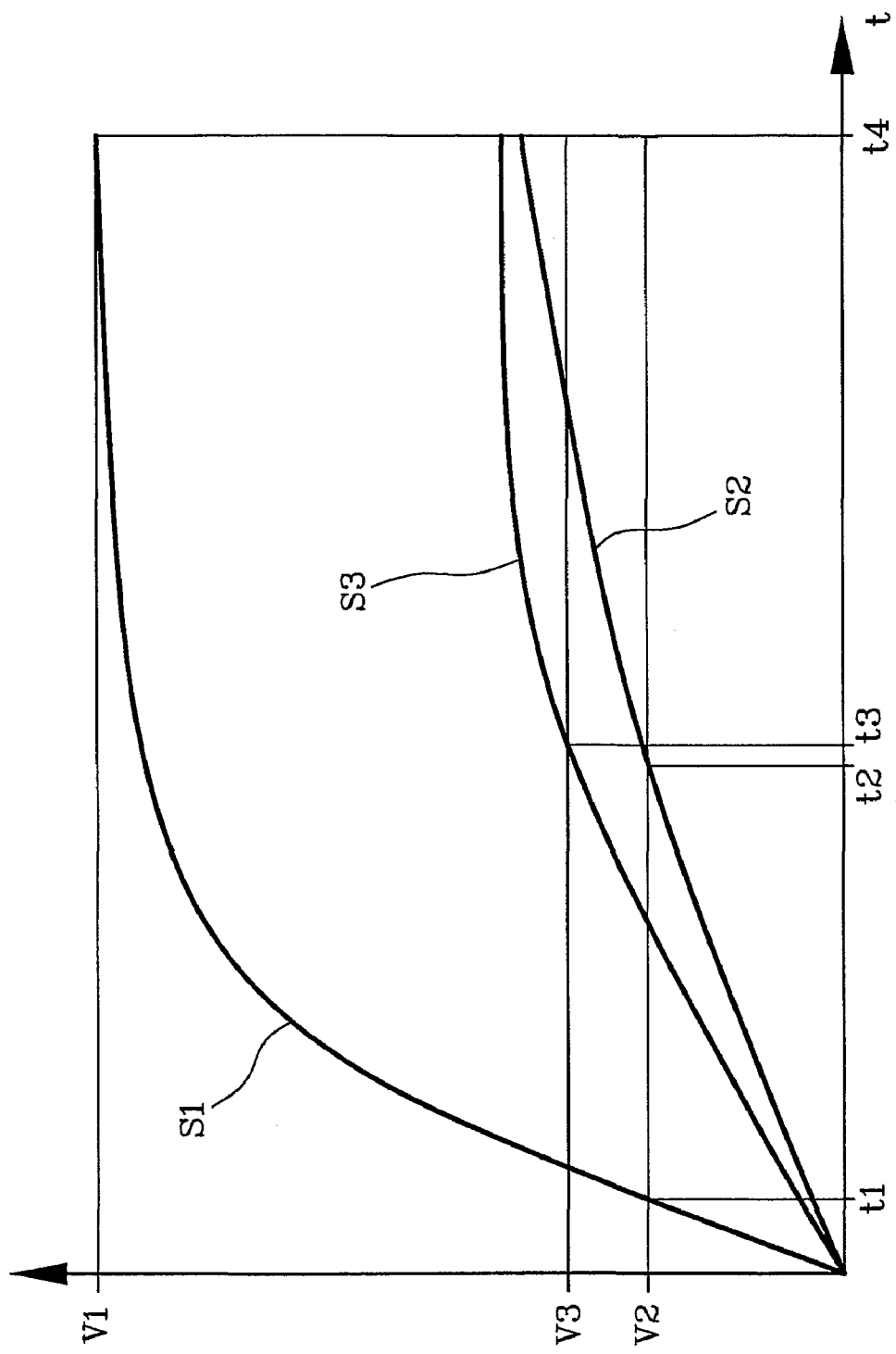

METHOD OF VULCANISING PNEUMATIC TYRES AND APPARATUS THEREFOR

CROSS REFERENCE TO RELATED APPLICATION

This application is a national phase application based on PCT/IT2005/000622, filed Oct. 27, 2005, the content of which is incorporated herein by reference.

BACKGROUND OF THE INVENTION

1. Field of the Invention

The present invention relates to a method and an apparatus for vulcanising pneumatic tyres.

2. Description of the Related Art

Generally, in the manufacture of pneumatic tyres for vehicle wheels it is provided that a moulding and vulcanisation treatment be carried out subsequently to a step of building the green tyre through assembly of the respective components, each of which has its own elastomer composition, and some of which are equipped with suitable reinforcing structures; said treatment aims at determining the structural stabilisation of the tyre through cross-linking of said elastomer compositions and at the same time, as generally required, enables formation of a desired tread pattern thereon as well as of possible distinctive graphic marks at the tyre sidewalls.

To this aim, the green tyre is introduced into a suitably heated vulcanisation mould having a moulding cavity of a shape conforming to the final shape to be given to the tyre itself.

After closure of the mould has occurred, the green tyre is pressed against the holding walls of the moulding cavity while simultaneously the necessary heat to carry out vulcanisation of the tyre itself is supplied. For the purpose, a bladder of toroidal conformation for example, is caused to expand within the tyre through admission of steam under pressure into said bladder, so as to bring the latter into contact with the inner surface of the tyre and compress said tyre against the holding walls of the moulding cavity.

The steam under pressure admitted to the expanded bladder within the tyre is also used to supply part of the necessary heat for vulcanisation. Another heat portion is supplied through the mould from the outside of the tyre, suitably heated by means of pipelines for circulation of steam or other heating fluid that are arranged in the vulcanisation apparatus.

Usually, the steam-supply temperature and pressure and the residence time of the tyre in the vulcanisation mould are managed following a pre-established program, obtained based on experimental data, so as to bring the tyre components having different elastomer compositions to a desired cross-linking degree.

When vulcanisation has been completed, supply of heat is stopped and the mould is opened to enable removal of the tyre and prepare the mould to a new moulding/vulcanisation cycle.

By so doing however, phenomena of over-vulcanisation and/or insufficient vulcanisation of the tyre or parts thereof can easily occur. These phenomena can, for example, take place following variations in the temperature of the steam used to heat the moulds. In addition, variations in the mould temperature can also occur, due to variations in the ambient temperature for example, or in the temperature of the heating fluids and the amount of heat dissipated by the mould in the time unit and/or in the opening periods of same between the end of a vulcanisation step and the beginning of vulcanisation on a subsequent tyre.

In an attempt to eliminate the above described problems, U.S. Pat. No. 3,718,721 proposes a method of controlling the vulcanisation state of at least one portion of a tyre during supply of heat to the same, according to which a probe for temperature detection is introduced into a predetermined tyre region.

During supply of heat to the tyre, detection of the temperature of the elastomer material in relation to time is carried out close to the probe, to calculate the true vulcanisation state reached by the tyre portion where the probe is inserted. On achievement of a predetermined cross-linking degree, supply of heat is stopped.

According to the teachings of U.S. Pat. No. 3,718,721, the probe for measurement of the temperature to be detected is disposed in a tyre region where heat transmission takes place with great difficulty, or in any case where the lowest cross-linking degree is expected to be reached at the end of the process. Should the presence of several probes at different tyre regions be provided, interruption of heat supply will be carried out based on the data sent by the probe detecting the lowest cross-linking degree. Bringing said tyre region to the right cross-linking degree will guarantee a sufficient vulcanisation also of the remaining tyre portions.

SUMMARY OF THE INVENTION

The Applicant has however noticed that also the method disclosed in U.S. Pat. No. 3,718,721 is unable to ensure an optimal control of the vulcanisation process.

The Applicant could in fact observe that an influence on the overall vulcanisation time is produced by the great number of hardly predictable and uncontrollable factors that can, depending on temperature, significantly affect the dynamics according to which heating in the different tyre regions takes place. For instance, the Applicant has observed that the temperature of the elastomeric components in the green tyre at the beginning of the vulcanisation step can significantly affect the dynamics according to which heating takes place in the different tyre regions.

Another important factor is the outdoor ambient temperature because the temperature of the green tyre introduced into the mould can depend thereon, as well as, as a result, the temperature gradients in the different tyre regions, above all in the initial steps of the vulcanisation process.

In addition, according to the Applicant's perception, the method disclosed in U.S. Pat. No. 3,718,721 would appear to be disadvantageous also in terms of productivity and costs because the vulcanisation of each tyre would basically require much longer times than necessary.

Another hardly controllable factor, above all in the production processes that do not involve storage of semifinished items during the tyre production (see document WO 01/32409 in the name of the Applicant, for example) is the time elapsing between production of each of the tyre components and introduction of the green tyre into the mould. During this temporary step in fact, the elastomeric components are submitted to cooling the degree of which depends on the outdoor temperature and, exactly on the above stated time gap.

The outdoor temperature can also affect heat dissipation from the mould in the period elapsing between opening of the mould itself for removal of the finished tyre and introduction of a new green tyre.

The Applicant has sensed that the control of a vulcanisation process carried out following the teachings of U.S. Pat. No. 3,718,721 could determine production of tyres which, at some regions, have a sufficient cross-linking degree to ensure the structural integrity of the tyre for purposes of safety in running, but are not optimal in terms of performance. For example, the elastomeric component may happen to have a cross-linking degree at the radially external portions of the tread band or at the bead, depending on circumstances, that is higher or on the contrary lower than the optimal cross-linking degree required for best performance.

This circumstance represents a problem of great importance, above all in manufacturing tyres for cars and/or motorcycles of high and very high performance, and/or to be used for competitions, where an excellent qualitative level also from the point of view of performance is required.

The Applicant has sensed that it is possible to significantly improve the present vulcanising methods by monitoring the cross-linking degree reached at least at two regions of the tyre.

Monitoring enables the supply of heat to be stopped at the moment that in a first tyre region a desired cross-linking degree has been reached which is adapted to ensure the performance characteristics of the tyre, and in a second tyre region a cross-linking degree higher than a minimum predetermined value capable of ensuring the characteristics of structural integrity of the tyre has been reached.

In particular, this first region is preferably part of the tread band, while the second region can preferably be part of the tread band too or of another tyre portion such as the bead region.

In more detail, in a first aspect, the present invention relates to a method of vulcanising pneumatic tyres, comprising the steps of:
    shutting a green tyre in a vulcanisation mould;
    supplying heat to the tyre to cause vulcanisation of same;
    monitoring, during heat supply, a first value of the cross-linking degree reached in a first detection region and a second value of the cross-linking degree reached in a second detection region, said first and second detection regions being disposed within the tyre;
    stopping heat supply upon occurrence of the following conditions:
i) the first value of the cross-linking degree reaches a first reference value higher than about 90%;
(ii) the second value of the cross-linking degree has overcome a second reference value which is lower than about 50%.

In a further aspect, the present invention relates to an apparatus for vulcanising pneumatic tyres, comprising:
    a vulcanisation mould having a moulding cavity for at least one green tyre;
    devices for heat supply to the green tyre shut in the vulcanisation mould, to determine vulcanisation of same;
    devices for monitoring a first value of the cross-linking degree reached in a first detection region and a second value of the cross-linking degree reached in a second detection region, said first and second detection regions being disposed within the tyre;
    control devices co-operating with the monitoring devices to stop heat supply when the first value of the cross-linking degree reaches a first reference value higher than about 90%, while the second value of the cross-linking degree has overcome a second reference value which is lower than about 50%.

Further features and advantages will be more apparent from the detailed description of a preferred, but not exclusive, embodiment of a method and an apparatus for vulcanising pneumatic tyres, in accordance with the present invention.

BRIEF DESCRIPTION OF THE DRAWINGS

This description will be set out hereinafter with reference to the accompanying drawings, given by way of non-limiting example, in which:

FIG. 3 is a graph obtainable from a laboratory test aiming at detecting the cross-linking degree against time of a test piece to a predetermined reference temperature;

FIG. 4 is a graph showing the variation in the cross-linking degree in different detection regions of a tyre submitted to a vulcanising process in accordance with the invention.

DETAILED DESCRIPTION OF THE INVENTION

Figure 1:
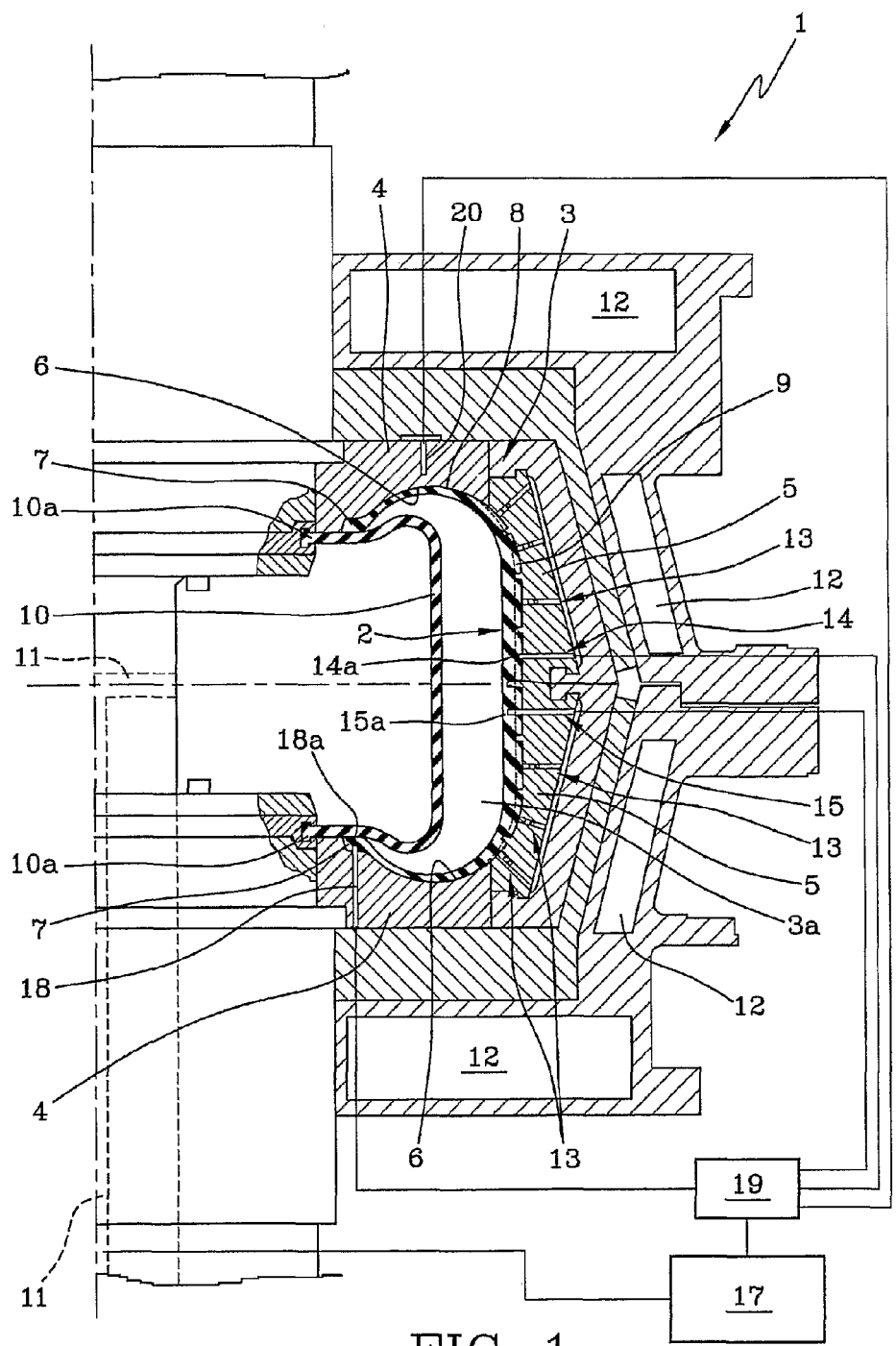
FIG. 1 diagrammatically shows one half in diametrical section of a vulcanisation mould being part of an apparatus for manufacturing tyres for vehicle wheels in accordance with the present invention.

With reference to FIG. 1, an apparatus for vulcanising pneumatic tyres of vehicle wheels in accordance with the present invention has been generally identified with reference numeral 1.

Apparatus 1 generally comprises a vulcanisation mould 3 defining a moulding cavity 3a adapted to receive a green tyre 2 to be submitted to a moulding and vulcanising process.

As shown in FIG. 1, the vulcanisation mould 3 has a pair of axially opposite plates 4 and a plurality of circumferential sectors 5 movable in a mutually approaching direction concurrently with closure of the mould 3. On closure of the mould, the plates 4 and sectors 5 define an inner surface 6 of the moulding cavity 3a the shape of which matches the final conformation to be given to tyre 2. In more detail, plates 4 are set to operate at the so-called beads 7 and sidewalls 8 of the tyre 2 being processed, while sectors 5 are adapted to operate on a tread band 9 of the tyre itself. The green tyre 2, once shut in mould 1, is pressed against the inner surface 6 of the moulding cavity 3a by a suitable device. Subsequently, or simultaneously with the pressing step, heat is supplied to the green tyre 2 pressed against said inner surface 6.

By effect of pressing, suitable ridges arranged on the sectors 5 and plates 4 cause formation of a desired pattern on the tread band 9 of tyre 2, as well as of a plurality of distinctive graphic marks on the sidewalls 6.

The supplied heat causes cross-linking of the different elastomer compositions of which the tyre is made up. When the cycle has been completed, the finished tyre (i.e. the moulded and cured tyre) is drawn out of the mould 3, after opening of the latter.

Shown in FIG. 1 by way of example is a pressing device comprising a bladder 10 of substantially toroidal conformation having two circumferential edges carrying respective anchoring tailpieces 10a to be sealingly engaged in the mould 3. A duct 11 formed in mould 3 for admitting steam or other operating fluid converges at the inside of bladder 10 so as to enable expansion of the latter following admission of fluid under pressure, thereby compressing the green tyre 2 against the plates 4 and sectors 5. Also operatively associated with mould 3, at plates 4 and/or sectors 5, are devices 12 to supply heat to the green tyre 2 to be vulcanised, which devices preferably co-operate with the steam admitted to the expandable bladder 10.

The vulcanisation mould 3 preferably further comprises a plurality of vent valves 13 mounted to regions of mould 3 close to the tyre shoulders and crown area, for example. The vent valves 13 mounted in respective through seats 13a arranged in the mould walls, perform the function of, concurrently with the pressing step, evacuating air pockets or other fluid possibly used in the vulcanisation process and present between the green tyre 2 and inner surface 6.

Also operatively associated with mould 3 are devices 14, 15, 18 for monitoring the value of the cross-linking degree reached by tyre 2, which devices are operatively connected with an electronic control unit 17 or other suitable control devices to stop heat supply to the tyre when a desired value of the cross-linking degree, to be better defined in the following, has been reached.

In more detail, the monitoring devices 14, 15, 18 comprise at least one first thermal-detection probe 14 and one second thermal-detection probe 15 operating on a first detection region 14a and a second detection region 15a respectively, defined in the tyre being processed.

Figure 2:
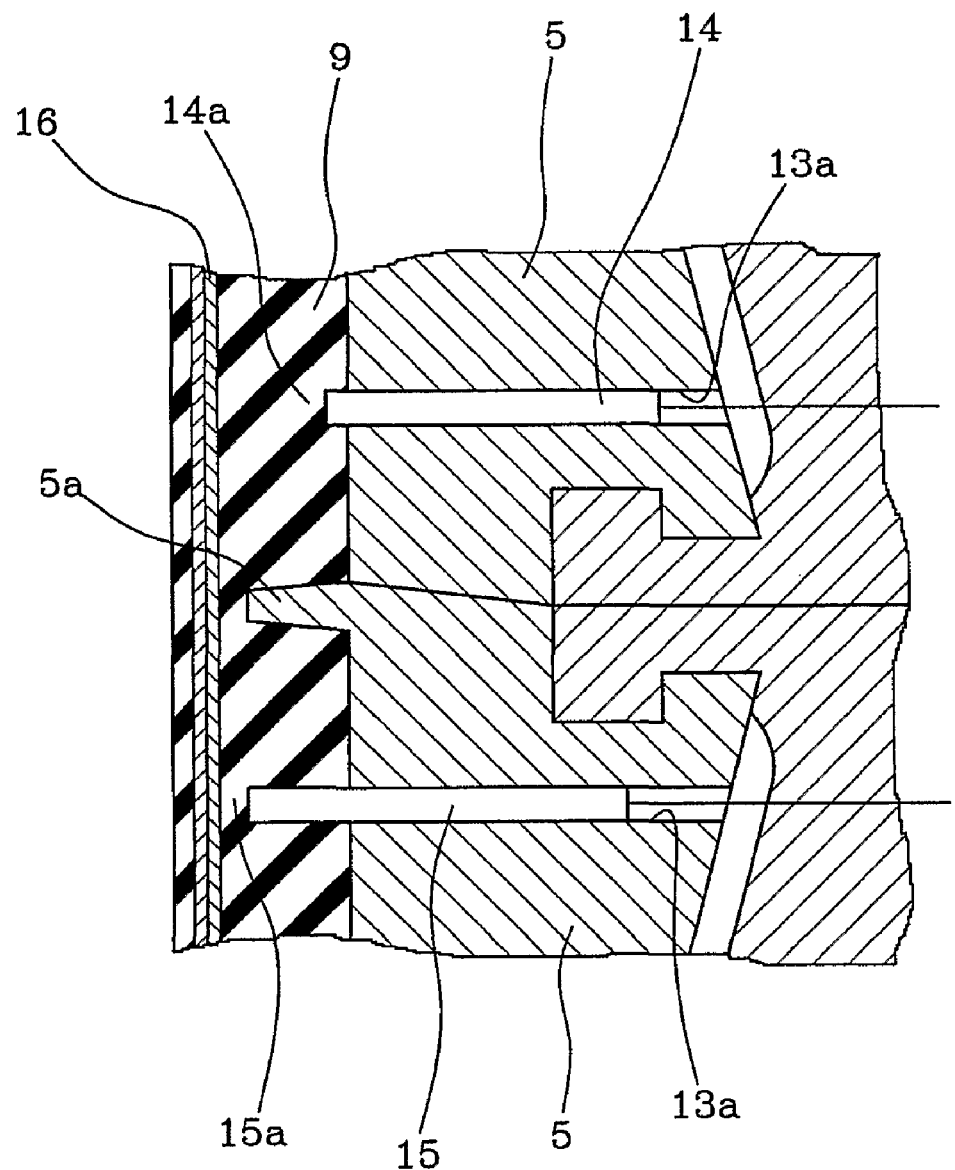
FIG. 2 shows an enlarged detail of FIG. 1 highlighting positioning of the thermal-detection probes within the mould.

Each of the thermal-detection probes 14, 15 projects a predetermined amount from the inner surface 6 of the moulding cavity 3a, so that it is included in the material having a specific elastomer composition and forming tyre 2 in the respective detection region 14a, 15a. As better viewed from FIG. 2, the thermal-detection probes 14, 15 preferably project from the inner surface 6 of the moulding cavity 3a by respectively different amounts, so that the first and second detection regions 14a, 15a are located in tyre 2 at respectively different depths, i.e. one at a radially more inward position than the other.

Preferably the thermal-detection probes 14, 15, or at least one of them, are associated with one of sectors 5 so that they project in the moulding cavity 3a close to the region set to operate against the tread band 9 of tyre 2.

By way of example, the first thermal-detection probe 14 can project from the moulding cavity 3a by an amount ranging between about 0.5 and about 3 mm, preferably of about 1 mm, so that the first detection region 14a is located at the outer surface of the tread band 9, to a distance that, by way of indication, is included between about 10% and about 30% of the tread thickness, where control of the cross-linking degree is particularly critical in relation to the performance characteristics of tyre 2 during use.

The second thermal-detection probe 15 in turn can project from the inner surface 6 of the moulding cavity 3a by an amount that, by way of indication, is included between about 1.5 and about 10 mm, preferably of about 8 mm, so that the second detection region 15a is located to a distance included, by way of indication, between about 70% and about 90% of the tread thickness, close to a belt structure 16 or other textile or metallic reinforcing structure usually integrated into tyre 2. To avoid damages to the belt structure 16 and/or the second thermal-detection probe 15, the probe itself may be provided to project from the inner surface 6 of the moulding cavity 3a by an amount that in any case does not exceed the amount of projection of the ridges 5a usually arranged in sectors 5 to form the above mentioned pattern on the tread band 9. In this manner, the second probe 15 and the respective detection region 15a keep a distance ranging, by way of indication, between about 0.5 and about 3 mm from the belt structure 16 or other textile or metallic reinforcing structure integrated into tyre 2.

Preferably, the first and/or second thermal-detection probes 14, 15 project from the inner surface 6 of the moulding cavity 3a in parallel to the movement direction of the respective sector 5, plate 4 or other movable portion during the opening and closing steps of mould 3.

Each probe 14, 15 therefore projects from the inner surface 6 of mould 3 in a direction substantially parallel to the mutual approaching direction between the inner surface 6 of mould 3 and the outer surface of tyre 2, during closure of mould 3. In this way transmission of undesirable bending stresses to the probes 14, 15 is avoided in the opening and closing steps of mould 3. It is therefore advantageously possible to use particularly thin probes 14, 15 to be housed in the through seats 13a in place of the vent valves 13, and having sizes adapted neither to cause changes in the geometrical and structural features of tyre 2, nor to produce clear footprints in the finished product.

During heat supply to tyre 2 enclosed in mould 3, the probes 14, 15 send the electronic control unit 17 signals representing the temperature reached by tyre 2 in the first and second detection regions 14a, 15a, respectively. Temperature detection through probes 14, 15 is carried out cyclically at relatively near time intervals, in the order of about 1 second for example, and preferably in the range between 0.1 and 60 seconds, so as to substantially carry out a continuous monitoring on the temperature course during the whole vulcanisation cycle.

All data representative of temperatures are processed by the electronic control unit 17 according to a suitable preset algorithm, following the Arrhenius law for example, to monitor the cross-linking degree deduced from a corresponding equivalent time (as hereinafter defined), that is gradually reached by the elastomer compositions present in the first and second detection regions 14a, 15a.

Preferably, the cross-linking degree is determined based on the following Arrhenius equation:

$$t1/t2 = \exp[-E/R(1/T2 - 1/T1)]$$

wherein:
R = universal gas constant;
E = energy of activation of the cross-linking reaction, characteristic typical of the cross-linkable elastomer composition used;
t1 = time required for obtaining the desired cross-linking degree at a constant reference temperature T1;
t2 = Time required for obtaining the desired cross-linking degree at a constant temperature T2.

Consequently, being known time t2 for reaching a desired cross-linking state at a specified constant temperature T2, it is possible to calculate time t1 required for reaching the same cross-linking state at the reference temperature T1. Time t1 is commonly referred to as "equivalent time" for cross-linking.

Previously entered in a storage unit associated with the electronic control unit 17, in relation to the elastomer composition present in the first and/or second detection regions 14a, 15a, are data representative of the required equivalent time so that the cross-linking degree may reach a first reference value ranging, by way of indication, between 95% and 100% and preferably higher than about 90% of the full cross-linking. Also entered in the storage unit 17 in relation to the elastomer composition present in the first and/or second detection region 14a, 15a are data representative of the required equivalent time so that, at said reference temperature, the cross-linking degree may reach a second pre-established reference value smaller than the first reference value. The second reference value is preferably included between 25% and 35%, and, just as an indication, it must not exceed about 50% of the full cross-linking.

Said data representative of the equivalent time, stored in the control unit 17, are previously established based on a laboratory test, carried out following the ISO 6502 standard for example, on a test piece of the elastomer composition present in the detection region itself and not cross-linked.

FIG. 3 is a graph obtainable from a typical laboratory test in which curve K represents the elastic reaction F opposed by the test piece in time t. As can be seen, in a starting step A of the test the elastic reaction F suffers a slight reduction, by effect of the reduced viscosity of the material following heating, until a minimum value Fmin is reached that is conventionally considered as a reference representing a cross-linking degree equal to zero. After the starting step A has been overcome, the elastic reaction F progressively increases until a maximum value Fmax is reached, which is conventionally allocated a per cent cross-linking degree equal to 100.

At each point P1, P2 of the curve length K subtending step B, the per cent value of the cross-linking degree reached by the material in the corresponding instant t1, t2 is expressed by:

$$100 \times (F1 - Fmin)/(Fmax - Fmin)$$

$$100 \times (F2 - Fmin)/(Fmax - Fmin), \text{ respectively,}$$

wherein F1 or F2 represents the elastic reaction value of the test piece at the instant t1 or t2.

The experimental data acquired during laboratory tests carried out on test pieces of the elastomer composition used in the detection region of tyre 2 are stored in the electronic control unit 17, so that the latter can calculate the cross-linking degree reached in the detection regions 14a, 15a, based on the data relating to the cyclically measured temperatures in time by the first and second thermal detection probes 14, 15.

In particular, using the equivalent-time values calculated at each reading cycle carried out by probes 14, 15, the electronic control unit 17 is able to calculate the cross-linking degree reached at each instant by said elastomer composition in the first and second detection regions 14a, 15a.

At each reading cycle of the thermal-detection probes 14, 15, the electronic control unit 17 compares the cross-linking degree calculated for each of the detection regions 14a, 15a with the respective first and second reference values, to operate interruption of heat supply, preferably concurrently with opening of mould 3, on occurrence of the following conditions:

(i) the value of the measured cross-linking degree at least at one of said detection regions 14a, 15a (preferably at the fist detection region 14a since the latter is close to the surface of the tread band 9) reaches a first reference value higher than about 90%;
  (ii) the cross-linking degree measured at each of the detection regions 14a, 15a has overcome a second reference value which is lower than about 50%.

Preferably the first reference value is included between about 95 and about 100%. Preferably the second reference value is included between about 25 and about 35%.

In this manner, a guarantee exists that at a given region of tyre 2, close to the outer surface of the tread band 9 for example where the first detection region 14a is measured, an optimal cross-linking degree as to the desired performance characteristics of tyre 2 is reached. Meanwhile, the control carried out in the second detection region 15a and/or other possible detection regions concerning inner parts of tyre 2 for example, that can be reached by heat with more difficulty, ensures that heat supply will not be stopped before the cross-linking degree in said parts has reached a value that, although still lower than the optimal cross-linking degree required in the first detection region 14a, is suitable to preserve the structural integrity of tyre 2 in use.

FIG. 4 is a graph illustrating the variation in the cross-linking degree measured following the above statements at different detection regions 14a, 15a of a tyre 2, in a vulcanisation cycle carried out in accordance with the invention.

Curves S1 and S2 represent the cross-linking degree against time respectively measured at the first detection region 14a located close to the outer surface of the tread band 9, and at the second detection region 15a disposed at a more inward position, close to the belt structure 16.

It is possible to observe that near the first detection region 14a, placed in close proximity to the inner surface 6 of the moulding cavity 3a and therefore very close to the heat supply source, the cross-linking degree (curve S1) increases more quickly than in the second detection region 15a. Consequently, the cross-linking degree in the first detection region 14a overcomes the second reference value V2 at instant t1, when the cross-linking degree in the second detection region 15a (curve S2) is still under the second value. As the vulcanisation cycle advances, the cross-linking degree overcomes the second reference value V2 in the second detection region 15a too at instant t2, when the cross-linking degree in the first detection region 14a is still under the first reference value V1. Consequently, heat supply goes on, until instant t4 at which the cross-linking degree in the first detection region 14a reaches the first reference value V1. As soon as this value is overcome, the electronic control unit 17 operates interruption of heat supply and opening of mould 3, to allow removal of tyre 2.

The cross-linking process in tyre 2 can go on over a certain period of time after extraction of the tyre itself from mould 3, by effect of the heat stored in tyre 2.

Positioning of the first and second thermal-detection probes 14 and 15 can be different from the previously described one, depending on the type and/or destination of use of tyre 2 being processed. The previously described example is particularly suitable, by way of indication, for high-performance tyres for sports uses, where the grip offered by the tread band 9 takes a particularly important role as regards the qualitative evaluation of tyre 2.

In other situations, a control of the cross-linking degree at the beads 7 of tyre 2 can be wished. In this case the first and/or second thermal-detection probes 14 and/or 15 can be placed in such a manner as to project in the moulding cavity 3a at a radially inner region set to operate against the tyre bead 7 where the first and/or second thermal-detection regions 14a, 15a will be defined.

As exemplified in the accompanying drawings, the cross-linking degree close to the bead 7 or any other desired third detection region 18a of tyre 2 can also be monitored by means of at least one third thermal-detection probe 18 interlocked with the electronic control unit 17. The electronic control unit 17 inhibits interruption of heat supply when the cross-linking degree measured by the third probe 18 is lower than a third reference value V3 which is lower than the first reference value V1. The third reference value V3 can equal or be different from the second reference value V2; in the example shown in FIG. 4 V3 is higher than V2.

In said FIG. 4, curve S2 relating to the third thermal-detection probe 18 is drawn; it reaches the third reference value V3 at an instant t3 subsequent to overcoming of the second reference value V2 in the second detection region 15a. However, on reaching of the third reference value V3 in the third detection region 18a, the cross-linking degree in the first detection region 14a has not yet reached the first reference value V1. Consequently, heat supply goes on until the first reference value V1 is reached in the first detection region 14a.

In accordance with a further preferential aspect of the present invention, the presence of probes 14, 15, 18 can be advantageously also exploited for monitoring the heat-distribution homogeneity within the tyre 2 being processed. To this aim, associated with the electronic control unit 17 can be at least one comparator 19 operatively interconnected with the thermal-detection probes 14, 15, 18 to compare data relating to the temperatures measured by each probe with each other, simultaneously with each of the detection cycles carried out by it. Comparator 19 calculates the difference between the temperatures measured by probes 14, 15, 18 at each detection cycle and compares the obtained result with the threshold value previously inputted to a storage unit. An excessive difference between the temperatures measured by the individual probes 14, 15, 18 is an indication of a probable malfunction of one or more of said probes. Advantageously, when the difference between the temperatures measured by the individual probes 14, 15, 18 overcomes the previously inputted threshold value, the electronic control unit 17 can disable control of the vulcanisation process, based on the data measured by the probes 14, 15, 18, in order to enable heat supply, based on a first previously entered alternative program ensuring heat supply for a period of time adapted to guarantee that a sufficient cross-linking degree will be reached in the whole structure of tyre 2. Since this first alternative program is to be managed in the absence of the data measured by the probes 14, 15, 18, it will necessarily involve vulcanisation times different from those obtainable by carrying out the control through said probes 14, 15, 18, but at all events it will enable the vulcanisation process to be carried out.

Also provided can be use of at least one auxiliary thermal-detection probe 20 operatively disposed in the mould 3 to detect the temperature within the mould itself. Preferably, the auxiliary probe 20 operates at a distance ranging between about 2 mm and about 35 mm from the inner surface 6 of the moulding cavity 3a. Preferably said distance is included between about 2 mm and about 10 mm.

The auxiliary probe 20 is operatively connected to comparator 19 interlocked with said first, second and/or third detection probes 14, 15, 18, or other distinct comparator carrying out a comparison between the temperature measured by the auxiliary probe 20 and a preset limit value, stored on the memory. During the heating step of the vulcanisation apparatus 1, the auxiliary detection probe 20 can be exploited to guarantee that mould 3 has reached an optimal operative temperature before starting the vulcanisation process. To this aim, the electronic control unit 17 is adapted to enable introduction of tyre 2 into mould 3 and/or closure of said mould 3, when the difference between the temperature measured by the auxiliary probe 20 and the preset limit value is lower than a predetermined acceptability threshold. During accomplishment of the vulcanisation process, an excessive deviation of the temperature of mould 3 from the optimal operative temperature is an indication of a probable malfunction of the thermal-detection probes 14, 15, 18 operating in tyre 2. Therefore, the electronic control unit 17 can advantageously interact with comparator 19 to enable heat supply based on a second pre-established alternative program, when the percent difference between the temperature of the vulcanisation mould 3 and the temperature measured by the probes 14, 15, 18 operating within tyre 2 overcomes a pre-established value, included, by way of indication, between about 3% and about 10%. Based on the second alternative program, adjustment of the vulcanisation time, i.e. interruption of heat supply when vulcanisation has been completed, can be controlled based on the temperature measured by the auxiliary probe 20 directly operating within the mould 3. In this case too, the vulcanisation time will be regulated in such a manner as to ensure a sufficient cross-linking degree within tyre 2, and basically will be different from that obtainable by the control carried out by the first, second and/or third thermal-detection probes operating in tyre 2.

The invention claimed is:

1. A method of vulcanising pneumatic tyres, comprising the steps of:
    shutting a green tyre in a vulcanisation mould;
    supplying heat to the tyre to cause vulcanisation of same;
    monitoring, during heat supply, a first value of cross-linking degree reached in a first detection region and a second value of cross-linking degree reached in a second detection region, said first and second detection regions being disposed within the tyre; and
    stopping heat supply upon occurrence of the following conditions:
    the first value of the cross-linking degree reaches a first reference value higher than about 90%; and
    the second value of the cross-linking degree has overcome a second reference value which is lower than about 50%.

2. The method as claimed in claim 1, wherein the monitoring step is carried out by cyclically calculating the value of the cross-linking degree reached in said detection regions at predetermined time intervals.

3. The method as claimed in claim 1, wherein monitoring of the value of the cross-linking degree in each of said detection regions comprises the steps of:
    cyclically measuring the temperature in each detection region at predetermined time intervals; and
    calculating the value of the cross-linking degree reached in each detection region based on measured temperature values.

4. The method as claimed in claim 2, wherein cyclical calculation of the value of the cross-linking degree is carried out at time intervals between about 0.1 and about 60 seconds.

5. The method as claimed in claim 1, wherein one of at least the first and second detection regions is at a radially more inward position than the other.

6. The method as claimed in claim 1, wherein at least one of said detection regions is substantially at a distance between about 0.5 and about 3 mm from an outer surface of the tyre.

7. The method as claimed in claim 1, wherein at least one of said detection regions is substantially at a distance between about 1.5 and about 10 mm from an outer surface of the tyre.

8. The method as claimed in claim 1, wherein at least one of said detection regions is disposed at a distance between about 0.5 and about 3 mm from a textile or metallic reinforcing structure integrated into the tyre.

9. The method as claimed in claim 1, wherein at least one of said detection regions is disposed close to a tread band of the tyre.

10. The method as claimed in claim 9, wherein said detection region at the tread band is disposed at a radially internal position relative to a radially external position of the tread band at a distance between about 10% and about 30% of the tread thickness.

11. The method as claimed in claim 9, wherein said detection region at the tread band is disposed at a radially internal position relative to a radially external surface of the tread band at a distance between about 70% and about 90% of the tread thickness.

12. The method as claimed in claim 1, wherein at least one of said detection regions is substantially disposed close to a bead of the tyre.

13. The method as claimed in claim 1, further comprising the step of monitoring the value of the cross-linking degree in at least one third detection region in the tyre during heat supply.

14. The method as claimed in claim 13, wherein interruption of heat supply is inhibited when the value of the crosslinking degree measured at the third detection region is lower than a third reference value which is lower than said first reference value.

15. The method as claimed in claim 3, further comprising the steps of:
comparing with each other, the temperatures respectively measured in said detection regions; and
enabling heat supply based on a first alternative program, when the difference between the temperatures respectively measured overcomes a predetermined threshold.

16. The method as claimed in claim 3, further comprising the steps of:
measuring vulcanisation mould temperature before shutting the tyre in the mould;
comparing temperature measured in the mould with a previously entered limit value; and
enabling shutting of the tyre in the mould when the difference between the temperature measured in the mould and a previously entered limit value is lower than a predetermined acceptability threshold.

17. The method as claimed in claim 3, further comprising the steps of:
measuring vulcanisation mould temperature;
comparing the vulcanisation mould temperature with the temperature measured in at least one of said detection regions; and
enabling heat supply based on a second alternative program, when the difference between the vulcanisation mould temperature and the temperature measured in at least one of said detection regions overcomes a predetermined value.

18. The method as claimed in claim 16, wherein the mould temperature is measured at a distance between about 2 mm and about 10 mm from an inner surface of the mould set to act against the tyre.

19. The method as claimed in claim 3, wherein temperature measurement in at least one of said detection regions is carried out by a probe projecting from an inner surface of the mould in a direction substantially parallel to a mutual-approaching direction between the inner surface of the mould and an outer surface of the tyre during shutting of the tyre in the mould.

20. The method as claimed in claim 1, wherein the first reference value is between 95% and 100%.

21. The method as claimed in claim 1 wherein the second reference value is between 25% and 35%.

22. An apparatus for vulcanising pneumatic tyres, comprising:
a vulcanising mould having a moulding cavity for at least one green tyre;
devices for heat supply to the green tyre shut in the vulcanisation mould to cause vulcanisation of same;
monitoring devices for monitoring a first value of cross-linking degree reached in a first detection region and a second value of cross-linking degree reached in a second detection region, said first and second detection regions being disposed within the tyre; and
control devices co-operating with the monitoring devices to stop heat supply when the first value of the cross-linking degree reaches a first reference value higher than about 90%, while the second value of the cross-linking degree has overcome a second reference value which is lower than about 50%.

23. The apparatus as claimed in claim 22, wherein each of said monitoring devices cyclically, at predetermined time intervals, calculates the cross-linking degree reached in said detection regions.

24. The apparatus as claimed in claim 22, wherein said monitoring devices comprise:
at least one first thermal-detection probe;
at least one second thermal-detection probe; and
an electronic control unit operatively connected to said first and second thermal-detection probes to detect the temperature in each detection region cyclically at predetermined time intervals and to calculate the cross-linking degree reached in each detection region based on measured temperature values.

25. The apparatus as claimed in claim 24, wherein each of said thermal-detection probes projects from an inner surface of the moulding cavity.

26. The apparatus as claimed in claim 25, wherein the thermal-detection probes project by different amounts respectfully from the inner surface of the moulding cavity.

27. The apparatus as claimed in claim 25, wherein at least one of said thermal-detection probes projects in the moulding cavity by an amount between about 0.5 mm and about 3 mm.

28. The apparatus as claimed in claim 25, wherein at least one of said thermal-detection probes projects in the moulding cavity by an amount between about 1.5 and about 10 mm.

29. The apparatus as claimed in claim 25, wherein at least one of said first and second thermal-detection probes projects in the moulding cavity at a region set to operate against one tread band of the tyre.

30. The apparatus as claimed in claim 25, wherein at least one of said thermal-detection probes projects in the moulding cavity close to a radially inner region set to operate against a bead of the tyre.

31. The apparatus as claimed in claim 24, wherein said monitoring devices comprise at least one third thermal-detection probe to monitor the cross-linking degree reached in at least one third detection region.

32. The apparatus as claimed in claim 31, wherein said control devices inhibit interruption of heat supply when a value of the cross-linking degree measured in the third detection region is lower than a third reference value which is lower than said first reference value.

33. The apparatus as claimed in claim 24, further comprising at least one comparator to compare with each other, temperatures respectively measured by said thermal detection probes, wherein said control devices are operatively interconnected with said comparator to enable heat supply based on a first alternative program, when the difference between temperatures respectively measured overcomes a predetermined threshold.

34. The apparatus as claimed in claim 24, further comprising:
at least one auxiliary thermal-detection probe operatively disposed in the mould to detect the vulcanisation mould temperature;
a comparator to compare the temperature measured in the mould with a previously entered limit value; wherein said control devices are operatively interconnected with said comparator to enable shutting of the tyre in the mould when the difference between measured temperature in the mould and the previously entered limit value is lower than a predetermined acceptability threshold.

35. The apparatus as claimed in claim 24, further comprising:
at least one auxiliary thermal-detection probe operatively disposed in the mould to detect vulcanisation mould temperature;
a comparator to compare the vulcanisation mould temperature with the temperature measured by at least one of said thermal-detection probes, wherein said control devices are operatively interconnected with said comparator to enable heat supply based on a second alternative program, when the difference between the vulcanisation mould temperature and the temperature measured by at least one of said thermal-detection probes overcomes a predetermined value.

36. The apparatus as claimed in claim 34, wherein the auxiliary thermal-detection probe operates at a distance ranging from about 2 mm to about 10 mm from an inner surface of said moulding cavity.

37. The apparatus as claimed in claim 24, wherein:
the mould comprises a plurality of portions movable in a mutually approaching direction to shut the tyre in the moulding cavity;
each of said thermal-detection probes is carried by one of said movable portions; and
at least one of said thermal-detection probes projects from an inner surface of the moulding cavity in a direction of movement of the respective movable portion during closure of the mould.

* * * * *